US012591480B2

(12) United States Patent
Wong et al.

(10) Patent No.: US 12,591,480 B2
(45) Date of Patent: Mar. 31, 2026

(54) AUTOMATIC IDENTIFICATION OF ROOT CAUSE AND MITIGATION STEPS FOR INCIDENTS GENERATED IN AN INCIDENT MANAGEMENT SYSTEM

(71) Applicant: Microsoft Technology Licensing, LLC, Redmond, WA (US)

(72) Inventors: Jimmy Chi Kin Wong, Seattle, WA (US); Supriyo Ghosh, Bangalore (IN); Rakesh Jayadev Namineni, Sammamish, WA (US); Mohit Verma, Seattle, WA (US); Chetan Bansal, Seattle, WA (US); Namrata Jain, Sammamish, WA (US); Rujia Wang, Chicago, IL (US); Wei Zhou, Bothell, WA (US); Sukriti Jain, Bothell, WA (US); Sanjana Gundala, Seattle, WA (US); Xuchao Zhang, Sammamish, WA (US); Senthil Kumar Muniyandi, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/490,353

(22) Filed: Oct. 19, 2023

(65) Prior Publication Data

US 2025/0130884 A1    Apr. 24, 2025

(51) Int. Cl.
*G06F 11/07*        (2006.01)
*G06N 3/0455*      (2023.01)

(52) U.S. Cl.
CPC ...... *G06F 11/0793* (2013.01); *G06F 11/0709* (2013.01); *G06F 11/079* (2013.01); *G06N 3/0455* (2023.01)

(58) Field of Classification Search
CPC .............. G06F 11/079; G06F 11/0709; G06F 11/0793; G06N 3/0455
See application file for complete search history.

(56) References Cited

U.S. PATENT DOCUMENTS

| | | | | |
|---|---|---|---|---|
| 2020/0272915 A1* | 8/2020 | Tata | ......................... | G06F 16/35 |
| 2020/0285564 A1* | 9/2020 | Ciano | ..................... | G06F 18/22 |
| 2022/0345356 A1* | 10/2022 | Triplet | ................. | G06N 20/00 |
| 2022/0358005 A1* | 11/2022 | Saha | ...................... | G06F 40/216 |
| 2022/0358163 A1* | 11/2022 | Makhija | .............. | G06F 16/3344 |
| 2022/0376970 A1* | 11/2022 | Chawathe | ........... | H04L 41/0654 |
| 2023/0328095 A1* | 10/2023 | Chesla | ................ | H04L 63/1425 726/23 |
| 2024/0007342 A1* | 1/2024 | Gupta | ..................... | H04L 41/16 |
| 2024/0412617 A1* | 12/2024 | Legare | ..................... | G06T 7/11 |

* cited by examiner

*Primary Examiner* — Jigar P Patel
(74) *Attorney, Agent, or Firm* — Ray Quinney & Nebeker P.C.; Paul N. Taylor

(57) ABSTRACT

A set of incident records are received for a computing system. The incident records are analyzed to identify similar incident records which are then linked. Incident clusters are generated based upon the links and incident records in each cluster are ranked. A prompt is generated to an artificial intelligence (AI) model based on the ranked, related incidents and the AI model returns a response that identifies a root cause and mitigation steps corresponding to the ranked incidents.

18 Claims, 10 Drawing Sheets

AUTOMATIC IDENTIFICATION OF ROOT CAUSE AND MITIGATION STEPS FOR INCIDENTS GENERATED IN AN INCIDENT MANAGEMENT SYSTEM

BACKGROUND

Computing systems are currently in wide use. Many computing systems include hosted services or applications or other types of computing systems.

During the operation of a computing system, various different types of incidents can occur. An incident is, in one example, an unplanned event of any kind that reduces the quality of service of a computing system, or that disrupts the quality of service, or that threatens to imminently reduce or disrupt the quality of service of the computing system. An example of an incident may be a web server that is operating at an inordinately slow speed so that it is interfering with productivity or increases the risk of a complete failure. Another example of an incident may be a business application that crashes.

Incidents are normally detected and logged. At some point, a developer or engineer may use an incident management system to analyze the logged incident and attempts to respond by mitigating or remedying the incident.

The discussion above is merely provided for general background information and is not intended to be used as an aid in determining the scope of the claimed subject matter.

SUMMARY

A set of incident records are received for a computing system. The incident records are analyzed to identify similar incident records which are then linked. Incident clusters are generated based upon the links and incident records in each cluster are ranked to identify a top ranked incident. A prompt is generated to an artificial intelligence (AI) model based on the ranked, related incidents and the AI model returns a response that identifies a root cause incident (top ranked incident) and mitigation steps corresponding to the root cause incident.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, incidents can occur with respect to any of a wide variety of different types of computing systems. The incidents are often detected and logged by a user, such as a user at a help desk or a user at another location. The incident logs are sometimes referred to as incident records or incident tickets. The incident logs can include descriptive information that describes the incident, as well as the date and time the incident is reported or detected, among other things.

It is not uncommon that, when one incident occurs in a computing system, that incident causes subsequent incidences to also occur in the computing system. In such an example, the first incident that caused the subsequent incidences to occur may be referred to as a root cause incident. Therefore, a plurality of different incidents may be detected and logged within a relatively short time window (e.g., within several hours or even within several minutes). In current systems, each of the incidents may be analyzed separately in order to attempt to respond to that separate incident. This can be a cumbersome, time consuming and error prone process, because an engineer or other person analyzing one incident may not even know of the other incidents, yet all of the incidents may be related and all may be caused by a single root cause incident.

The present description thus describes a system which automatically accesses incident records, when a new incident record is received, to identify similar incidents or related incidents. The present system then generates a link between related incidents. Based on the links, an incident cluster is generated and a ranking system ranks the incidents in each incident cluster to identify a top ranked incident. An artificial intelligence (AI) prompt is generated based upon the ranked incidents. The prompt is used to prompt an AI model. The AI model returns a response that identifies a root cause incident as well as mitigation steps that can be used to remedy or mitigate the impact of the root cause incident. The root cause incident and mitigation steps can be output to an engineering system where the mitigation steps can be automatically executed or where an engineer can initiate and/or implement execution of the mitigation steps. The present system thus greatly enhances the accuracy of the operation of the computing system, reduces downtime or other interruptions caused by incidents, and greatly increases the accuracy and speed with which root cause incidents can be identified and remedied or mitigated. Thus, the present system improves the operation and robustness of the computing system itself.

Figure 1:
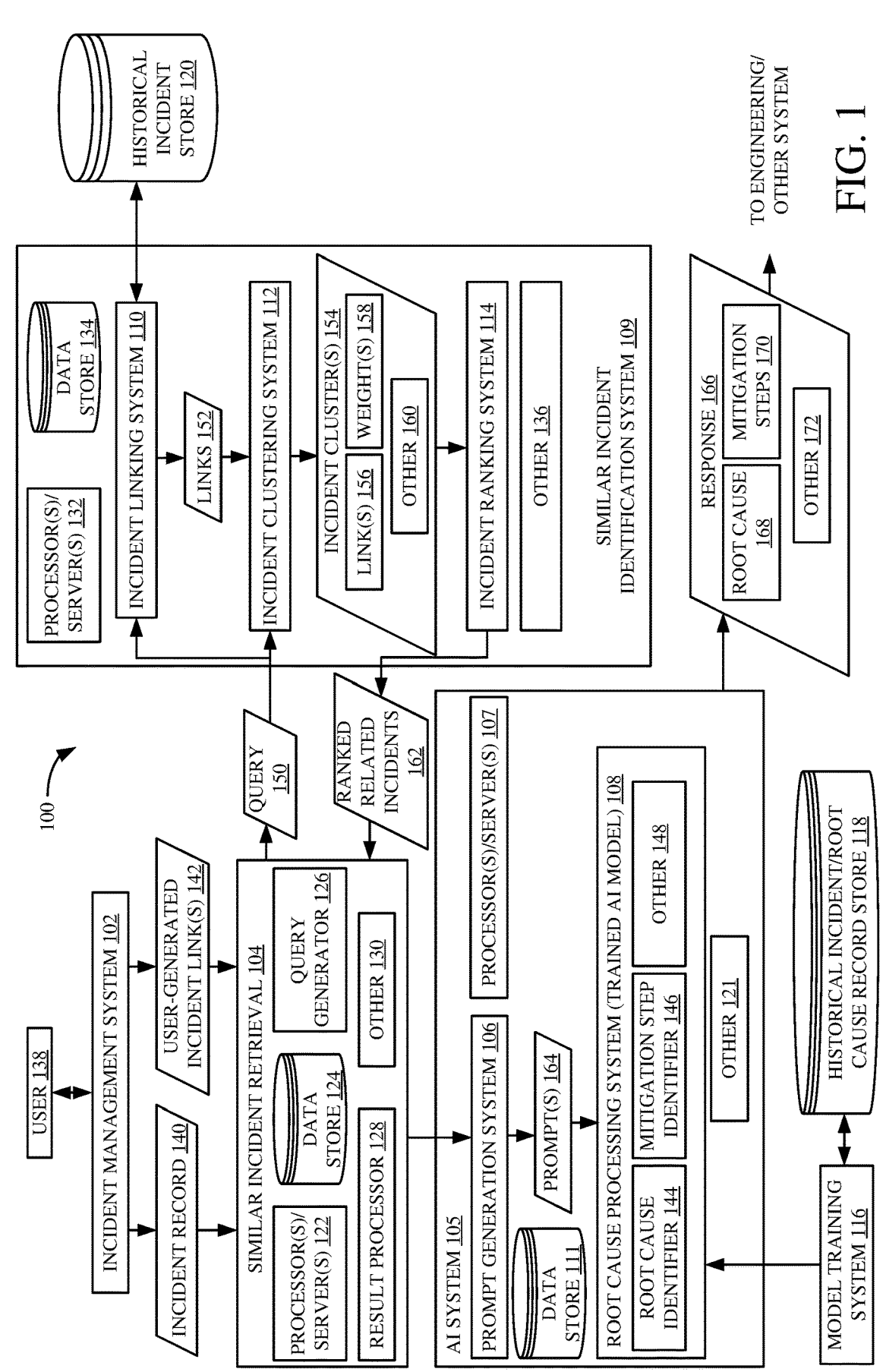
FIG. 1 is a block diagram of one example of a computing system architecture.

FIG. 1 is a block diagram of one example of a computing system architecture 100. Architecture 100, in the example shown in FIG. 1, includes incident management system 102, similar incident retrieval system 104, AI system 105, similar incident identification system 109 and model training system 116. Architecture 100 also includes historical incident/root cause record store 118, and historical incident store 120.

Incident management system 102 may be accessible by one or more different users 138. Similar incident retrieval system 104 can include one or more processors or servers 122, data store 124, query generator 126, result processor 128, and other items 130. AI system 105 can include one or more processors or servers 107, data store 111, prompt generation system 106, root cause processing system (e.g., trained AI model) 108, and other items 121. Root cause processing system 108 includes root cause identifier 144, mitigation step identifier 146, and other items 148. Similar incident identification system 109 can include one or more processors or servers 132, data store 134, incident linking system 110, incident clustering system 112, incident ranking system 114, and other items 136. Before describing the overall operation of architecture 100, a description of some of the items in architecture 100, and their operation, will first be provided.

Users 138 may detect incidents and use incident management system 102 to generate incident records 140. In one example, each incident record 140 may include such things as an incident title, an incident identifier, a summary of the incident, a time and date when the incident occurred or was detected, a tenant where the incident was detected, and any of a wide variety of other information. User 138 can also use incident management system 102 to create user-generated incident links 142. User-generated incident links 142 are used to link incident record 140 to other incident records for other incidents that have been detected. For instance, it may be that user 138 works at a help desk and has detected a plurality of different incidents that appear to user 138 to be related to one another. In that case, user 138 can use incident management system 102 to manually identify the related incidents and thus create a link that links the incident records for the related incidents. Incident management system 102 may expose an interface that can be accessed by user 138 to enter information to create incident record 140 and user-generated incident links 142. Incident management system 102 can automatically generate some of the information in incident record 140 (e.g., a unique incident identifier, the date and time, etc.). Incident management system 102 can be configured in other ways as well.

Similar incident retrieval system 104 receives the incident record 140 and any user-generated incident links 142 and generates a query 150 to similar incident identification system 109 requesting similar incidents (that have incident records that are similar to incident record 140). Query generator 126 generates query 150 such that query 150 can include information from the incident record 140 as well as any user-generated incident links 142.

Incident linking system 110 accesses historical incident store 120 which stores incident records for recently received incidents (such as incidents received within the last four hours, etc.) and automatically identifies incident records that are similar to incident record 140. When a similar incident record is identified, incident linking system 110 automatically generates a link between those two incidents or incident records. Incident linking system 110 may also automatically generate a weight along with each link that indicates the degree of similarity between the linked incidents or incident records, or the confidence with which incident linking system 110 has identified the incidents or incident records as being similar or related. By automatically it is meant, in one example, that the operation or function is performed without further human involvement except, perhaps to initiate or authorize the operation or function. One example of generating links is described in greater detail below with respect to FIGS. 3 and 4.

The automatically generated links 152 and weights can be provided to incident clustering system 112, along with any user-generated incident links 142. For instance, incident clustering system 112 can cluster all linked incidents together into an incident cluster 154. Each incident cluster 154 may include a set of links 156 which includes both the automatically generated links 152 and the user-generated links 142. Each cluster can include a set of weights 158 with a weight corresponding to each link 156. In one example, the user-generated incident links 142 are given a higher weight than the automatically generated links 152. For instance, each of the automatically generated links 152 may be assigned a weight between 0.1 and 0.9, based upon the similarity or relatedness of the incident records identified by incident linking system 110. The user-generated incident links 142 may be given a weight of 1.0. These values are examples only, and other weight values may be used for weights 158. Incident clusters 154 may include other items 160 as well. Also, the automatically generated links 152 can be filtered based on feedback, such as from an engineer. As an example, the automatically generated links 152 may be provided to the engineer for review. The engineer may filter the links 152 by the rejecting some of them and keeping others.

Incident ranking system 114 receives the incident cluster 154 and ranks the incidents identified in the incident cluster 154 based upon the weights 158 corresponding to each of the links 156. In one example, the incident records are ranked based upon the number and weight of links to that incident record. Incident ranking system 114 then generates an output 162 indicative of the ranked and related incidents. Ranking the incidents in an incident cluster 154 is described in greater detail below with respect to FIGS. 5 and 6.

Result processor 128 then configures the ranked, related incidents 162 along with incident record 140 (or portions of incident record 140) for use by prompt generation system 106. Thus, result processor 128 generates an output indicative of the incident record 140 as well as context information identifying related incidents and a most highly ranked incident, of the related incidents in the incident cluster 154.

Prompt generation system 106 then generates a prompt 164. Prompt 164 can be a single, complex prompt which is provided to root cause processing system 108 (which may be a trained AI model), where the prompt 164 prompts system 108 to identify the top ranked incident as the root cause of the incidents identified in the prompt as well as mitigation steps that can be used to remedy or mitigate the root cause incident. In another example, prompt generation system 106 can generate a plurality of chained prompts 164 to obtain the desired information.

Root cause processing system 108 can be a generative AI model or an AI classifier or another type of AI model. For instance, system 108 may be a large language model (LLM) which receives prompts 164 and generates an output or response 166 that includes an identifier of a root cause incident 168, a set of mitigation steps 170, and other items 172. An LLM is a language model that includes a large number of parameters (often in the tens of billions or hundreds of billions of parameters). An LLM is often referred to as a generative AI model in that it receives, as an input, a prompt which may include data and an instruction to generate a particular output. For instance, for such models a generative AI model may be asked to generate a set of mitigation steps 170 given an identified root cause incident 168. The individual items in the root cause processing system 108 can be individual AI models or they can be incorporated into a single AI model.

Therefore, root cause identifier 144 may be an AI model classifier or another type of AI model that, in response to prompt 164, identifies the top ranked incident as a root cause incident 168. Mitigation step identifier 146 may be a generative AI model or another type of AI model that, in response to the identified root cause incident, generates a set of mitigation steps 170 that can be used to remedy or mitigate the impact of the root cause incident 168.

Root cause processing system 108 generates response 166 that includes an identifier that identifies a root cause incident 168 along with a set of mitigation steps 170 (or a location where the mitigation steps 170 can be accessed). The mitigation steps can be executed either automatically or manually or in a semi-automated way to remedy the root cause incident or to at least mitigate the impact of the root cause incident. Response 166 can be provided to an engineering system or other system, or back to user 138, or elsewhere.

Model training system 116 may obtain a pre-trained AI model and fine tune that AI model based upon information in the historical incident/root cause record store 118. For instance, record store 118 may include a set of historical incident records where the root cause has already been identified, and where the mitigation steps have been identified as well. That information can be used as training data by model training system 116 to fine tune the AI model or models used in root cause processing system 108.

Figure 2:
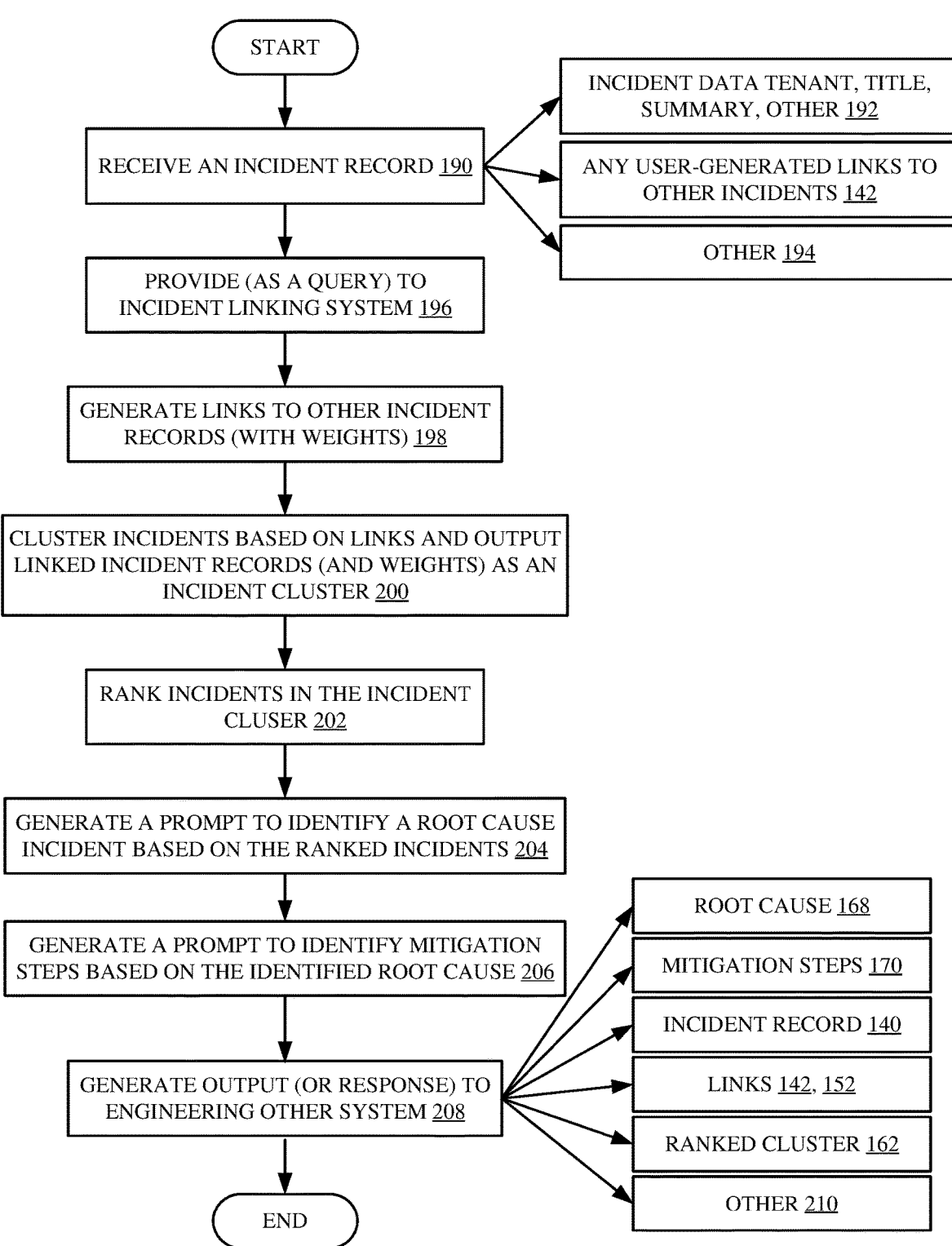
FIG. 2 is a flow diagram illustrating one example of the operation of the computing system architecture shown in FIG. 1.

FIG. 2 is a flow diagram illustrating one example of the operation of architecture 100, in more detail. Similar incident retrieval system 104 first receives an incident record 140 from an incident management system 102, or elsewhere. Receiving the incident record is indicated by block 190 in the flow diagram of FIG. 2. The incident record 140 may include incident data such as a tenant where the incident occurred, a title of the incident, a summary of the incident, and any of a wide variety of other information, as indicated by block 192. The incident record may also include, or be provided along with, user-generated links to other incidents, as indicated by block 142. The incident record can be generated in other ways and include other information as well, as indicated by block 194.

Query generator 126 then generates a query 150 to incident linking system 110 in similar incident identification system 109, as indicated by block 196 in the flow diagram of FIG. 2. Incident linking system 110 generates links to other incident records, along with weights corresponding to those links 152. Generating links is indicated by block 198 in the flow diagram of FIG. 2 and the operation of incident linking system 110 is described in greater detail below with respect to FIGS. 3 and 4.

The links 152 (along with the weights, and which may be filtered) are provided to incident clustering system 112. Incident clustering system 112 also receives any user-generated incident links 142. Based upon the received links, and the weights corresponding to those links, incident clustering system 112 clusters the incidents to generate one or more incident clusters 154. The clustering process can incorporate a variety of other clustering characteristics or clustering criteria as well. Such characteristics can include such things as cluster size, the number of different tenants where the incidents arose, etc. For example, some clusters may be too small (below a threshold number of incidents) or have incidents which all arise in the same team in an organization. In those cases, the clusters can be filtered out and no longer used for ranking, etc. Clustering the incidents based upon the links is indicated by block 200 in the flow diagram of FIG. 2.

The incident clusters 154 are provided to incident ranking system 114. Incident ranking system 114 ranks the incidents in the incident cluster 154, based upon the links and weights. Ranking the incidents in the incident cluster 154 is indicated by block 202 in the flow diagram of FIG. 2. The operation of incident ranking system 114 is described in greater detail below with respect to FIGS. 5 and 6.

The ranked, related incidents 162 are provided back to similar incident retrieval system 104 where result processor 128 outputs that information to prompt generation system 106. Prompt generation system 106 thus receives the information indicative of incident record 140, along with context information identified in the ranked and related incidents 162. Prompt generation system 106 then generates a prompt 164 that is provided to root cause processing system 108 which prompts the system 108 to identify a root cause incident. Generating a prompt 164 is indicated by block 204 in the flow diagram of FIG. 2. Prompt generation system 106 also generates a prompt 164 to identify mitigation steps based upon the identified root cause incident, as indicated by block 206. Again, the prompt 164 can be a complex prompt which prompts system 108 to both identify the root cause incident and the mitigation steps, or the prompt 164 can be a chained prompt which first requests system 108 to identify the root cause incident and then, based upon that output, prompts system 108 to identify the mitigation steps. Root cause processing system 108 then generates an output or response 166 which can be provided to an engineering system or another system, as indicated by block 208 in the flow diagram of FIG. 2. The response 166 can include a root cause identifier 168, a mitigation step identifier 170 (which identifies mitigation steps or a location where the mitigation steps can be accessed). The response 166 can include a wide variety of other information such as incident record 140, the links 152 and 142, the rank clusters 162, the identity of impacted tenants, impacted teams, impacted components, impacted customers, and a wide variety of other information 210.

Figure 3:
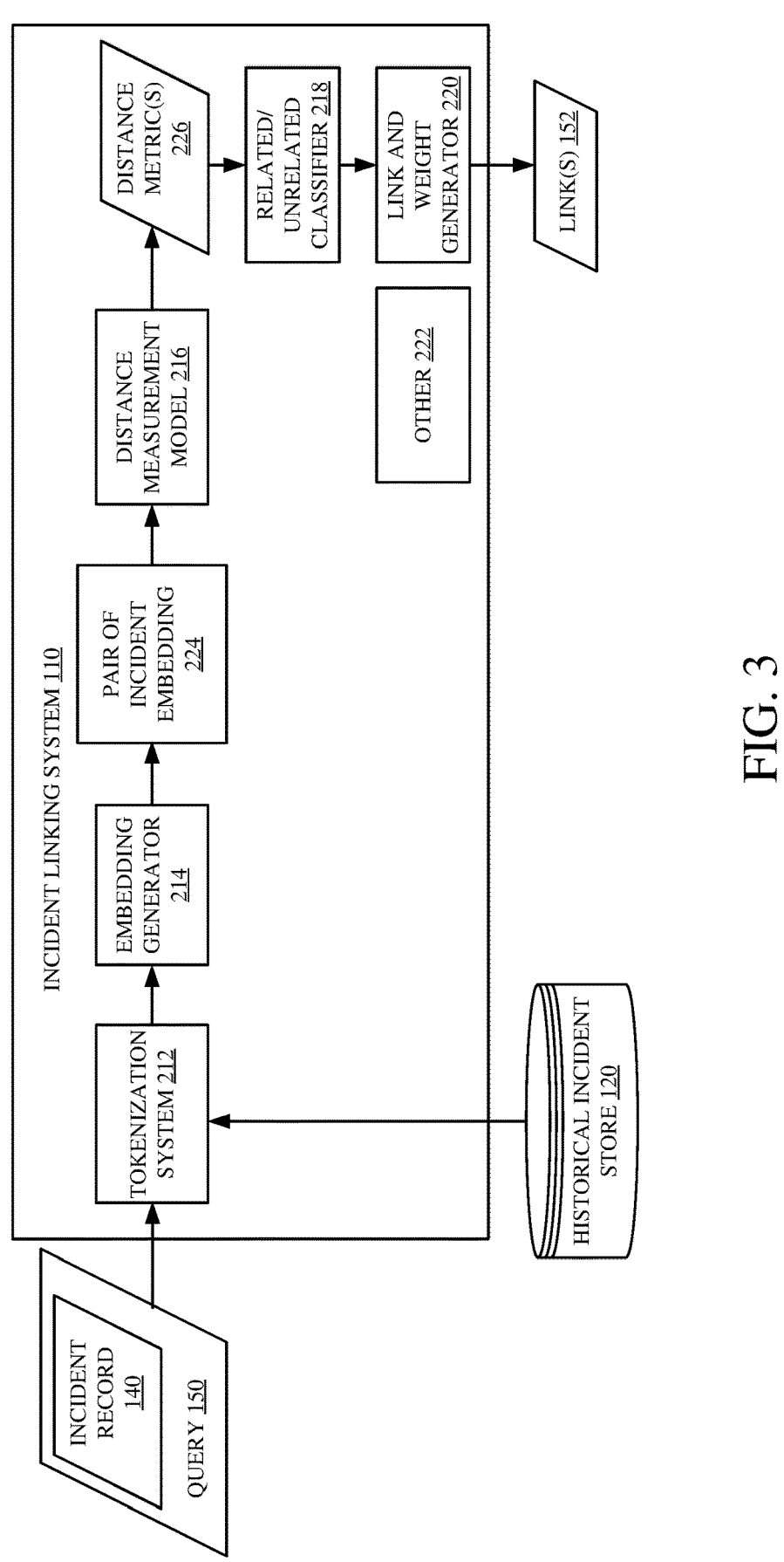
FIG. 3 is a block diagram showing one example of an incident linking system in more detail.

FIG. 3 is a block diagram showing one example of incident linking system 110 in more detail. In the example shown in FIG. 3, incident linking system 110 includes tokenization system 212, embedding generator 214, distance measurement model 216, related/unrelated classifier 218, link and weight generator 220, and other items 222. Incident linking system 110 is also shown receiving a query 150 which includes incident record 140 or at least a portion of incident record 140.

Tokenization system 212 tokenizes the incident record 140 (and perhaps other information in query 150). For instance, tokenization system 212 can generate a vector of tokens corresponding to or representing the words in the title, summary, and other information in incident record 140. Tokenization system 212 can also obtain an incident record from historical incident store 120 (which may store incident records for incidents received in the last time period, such as in the last four hours, in the last two hours, in the last day, etc., where the specific time period may be derived empirically, or a default period, a dynamically changing period, etc.). Tokenization system 212 thus tokenizes the incident record 140 and one of the historical incident records received from data store 120 to obtain a tokenized pair and provides the tokenized pair to embedding generator 214. Embedding generator 214 generates embeddings or encodings from each of the tokenized inputs in the pair and provides the pair of incident embeddings 216 (generated based upon tokenized incident record 140 and a tokenized selected incident record from store 120) to distance measurement model 216. Distance measurement model 216 identifies a distance (such as a Euclidean distance or a Euclidean squared distance) between the pair of embeddings 216 to generate a distance metric 220. The pair of tokenized embeddings is indicated by block 224 and the distance metric is indicated by block 226.

The embedding generator 214 can be any of a variety of different generators that take an input and generate an embedding for that input. In one example, embedding generator 214 may be a Siamese network which operates to generate embeddings that are closer to one another when the two inputs are similar or are in a same or similar class of incidents and generates embeddings that are further away from one another when the two inputs are dissimilar or from a different class of incidents. The embedding generator may, for instance, be a long/short-term memory (LSTM) network, or another network or generator. The embedding generator 214 may be a generative artificial intelligence model (such as a large language model-LLM), or another embedding generator.

If the embeddings are close to one another, or similar to one another, then the Euclidean squared distance between the two embeddings represented by distance metric 226 will be relatively small. However, if the embeddings are far from one another, or highly dissimilar, the Euclidean squared distance between the two embeddings as represented by the distance metric 226 will be relatively large.

The distance metric 226 is provided to related/unrelated classifier 218 which determines whether the two embeddings (and thus the two incident records in the pair) are related or unrelated based upon the distance metric 226. In one example, classifier 218 compares the distance metric 226 to a threshold value. If the distance metric 226 meets the threshold value, this may indicate that the two embeddings (and thus the two incident records) are dissimilar or unrelated. If the distance metric 226 does not meet the threshold value, this may indicate that the two embeddings (and thus the two incident records) are similar or related. Classifier 218 generates an output indicative of whether the two embeddings are related or unrelated to link and weight generator 220. Link and weight generator 220 generates a link between related or similar incident records corresponding to related or similar embeddings and also generates a weight corresponding to that link. The weight may be based upon the distance metric 226 so the smaller the distance metric the larger the weight. The weight may be another type of confidence metric that is indicative of a confidence with which related/unrelated classifier 218 has identified the two embeddings as being similar or related. Link and weight generator 220 thus generates links 152 (which may also include the weights corresponding to the links) that are provided to incident clustering system 112.

Figure 4:
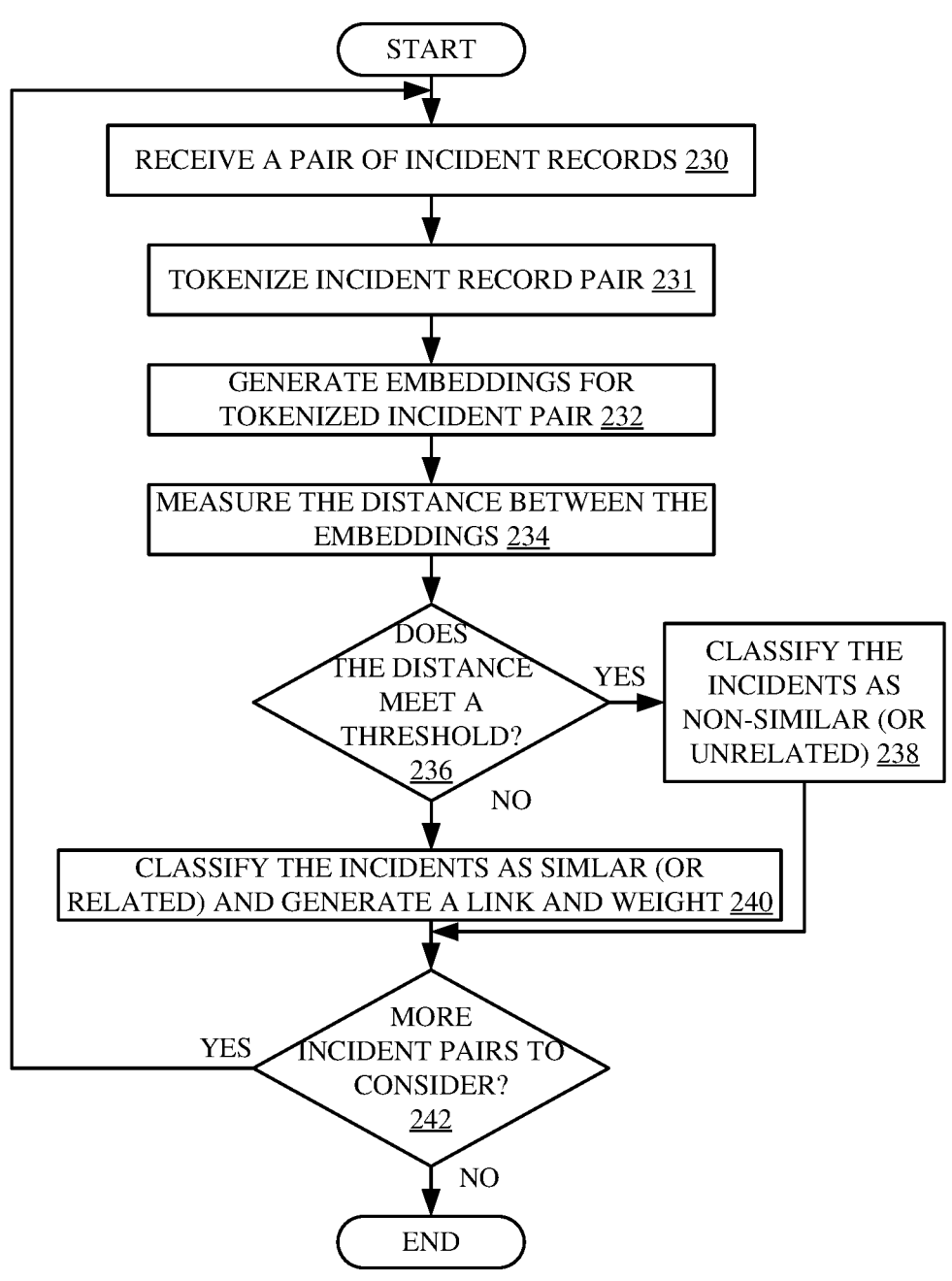
FIG. 4 is a flow diagram illustrating one example of the operation of the incident linking system shown in FIG. 3.

FIG. 4 is a flow diagram illustrating one example of the operation of incident linking system 110 in more detail. Incident linking system 110 first receives a pair of incident records, as indicated by block 230 in the flow diagram of FIG. 4. The incident records may include, for instance, an incident record 140 for a newly received incident, as well as an incident record that has been received within a predetermined time period that is selected from historical incident store 120. Tokenization system 212 then tokenizes the incident record pair, as indicated by block 230 and provides the tokenized incident records to embedding generator 214. Embedding generator 214 generates embeddings for the tokenized incident pair, as indicated by block 232. The pair of incident embeddings 224 is then provided to distance measurement model 216 which measures the distance between the embeddings, as indicated by block 234. Again, the distance may be measured in terms of the Euclidean squared distance or another distance metric.

The distance metric 226 is provided to related/unrelated classifier 218 which classifies the incident pair as being related to one another or unrelated. For instance, classifier 218 can determined whether the distance metric meets a threshold value, as indicated by block 236. If the distance metric does meet the threshold value, this indicates that the two incident embeddings are far enough apart that the underlying incident records are not similar or are unrelated. Thus, classifier 218 classifies the incidents as non-similar or unrelated, as indicated by block 238 in the flow diagram of FIG. 4. However if, at block 236, classifier 218 determines that the distance metric does not meet the threshold value, then this means that the underlying incident records are close enough or similar enough to be classified as similar or related, and link and weight generator 220 generates a link between the two incident records, and a corresponding weight indicative of the strength of that link. Identifying the embeddings as similar or related and generating a link and weight between the two incident records is indicated by block 240 in the flow diagram of FIG. 4. The link and weight can be output as link 152.

Tokenization system 212 then determines whether the incident record 140 should be compared against any other incident records that have been received and are stored in historical incident store 120 or whether any of the incident records in store 120 should be compared to each other. Such a determination is indicated by block 242 in the flow diagram of FIG. 4. If so, processing reverts to block 230 where another pair of incident records is received at tokenization system 212. The prior tokenization of incident record 140 can be used so that only the newly selected incident record needs to be tokenized.

Figure 5:
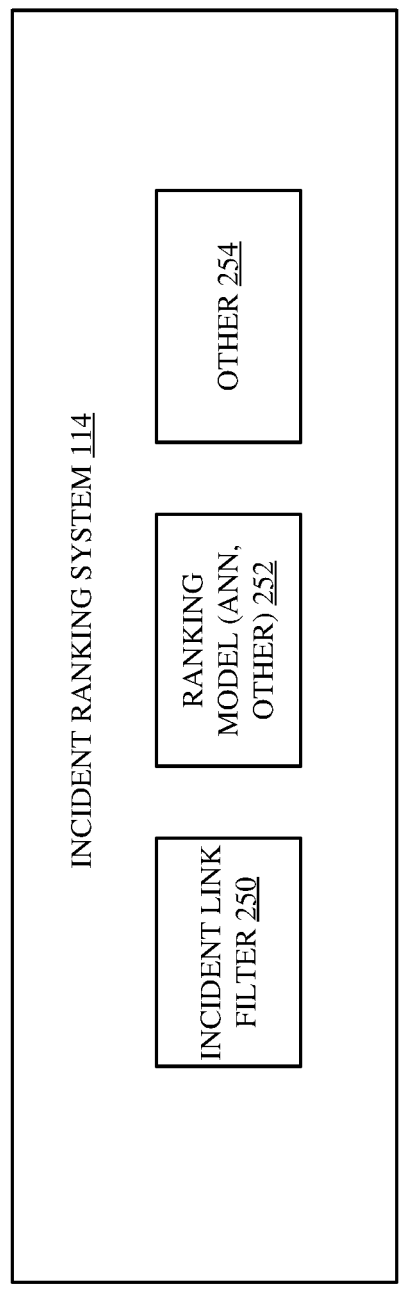
FIG. 5 is a block diagram showing one example of an incident ranking system in more detail.

FIG. 5 is a block diagram showing one example of incident ranking system 114 in more detail. Recall that, in one example, incident ranking system 114 receives clusters 154 of linked incident records. Each link 156 between a pair of incident records also includes a weight 158 indicative of the strength of that link. In one example, incident ranking system 114 includes incident link filter 250, ranking model (which may an artificial neural network or another model) 252, and other items 254. Incident link filter 250 receives a cluster 154 and filters out links 156 from that cluster that have a sufficiently low weight 158. For instance, the weight 158 corresponding to a link 156 may be compared against a threshold value. If the weight 158 is below the threshold value, this may indicate a highly tentative link between the two corresponding incident records. Therefore, if the weight 158 falls below the threshold value, then incident link filter 250 may discard that link or otherwise filter out that link. Further, as discussed elsewhere, cluster size can be used to filter out clusters. The number of tenants where the incidents arose can be used to filter clusters, as can other cluster characteristics or filter criteria.

Once all of the links 156 have been filtered, ranking model 252 ranks the incident records that are linked by the links. In one example, ranking model 252 employs a ranking algorithm that ranks the incident records based upon the number of links that link to those records, as well as based upon the weight of each of those links. For instance, an incident record that has a high number of links to it may be ranked higher than an incident record that has a low number of links to it. The weight of the links may also be considered in ranking the incident records.

Figure 6:
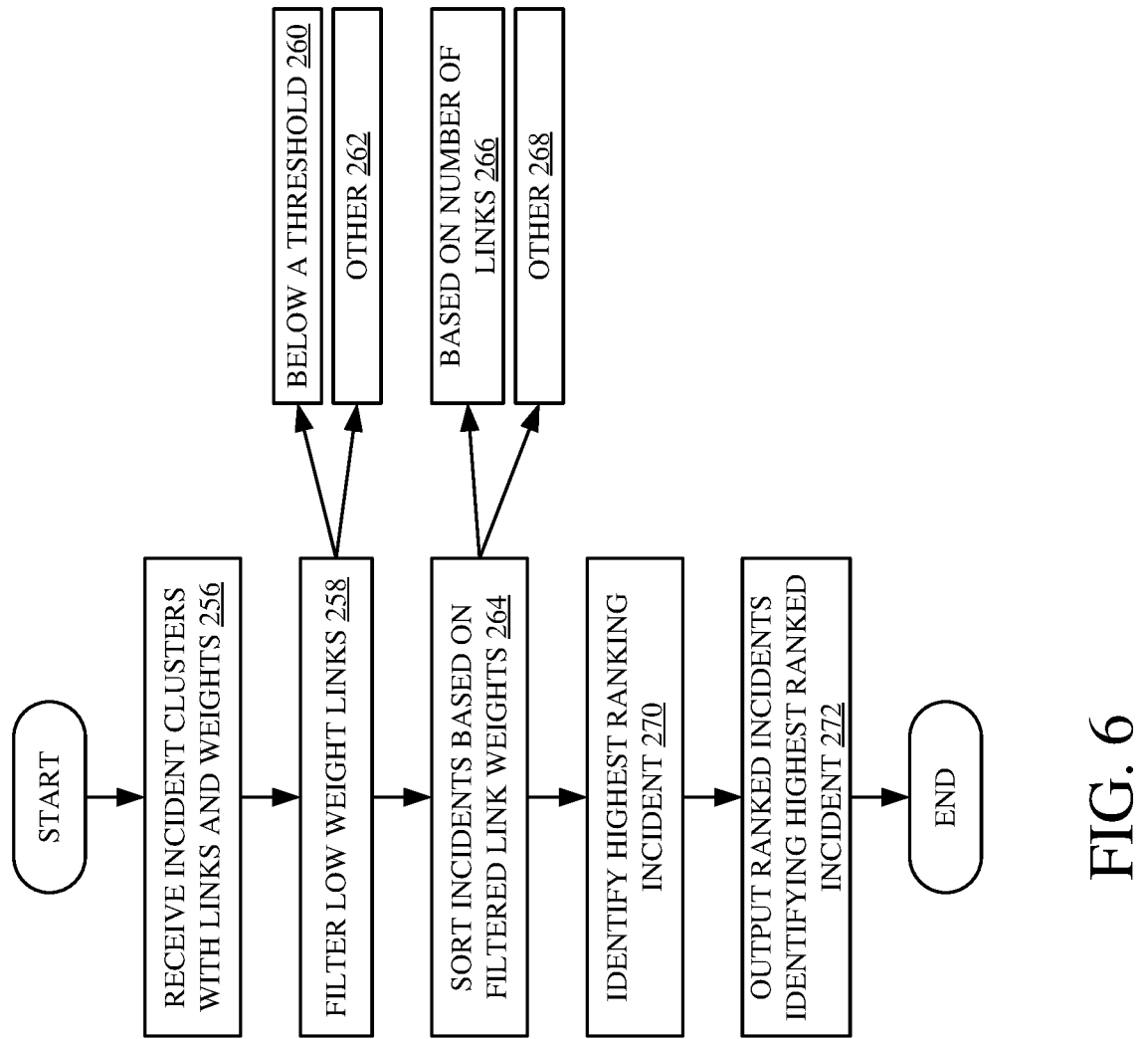
FIG. 6 is a flow diagram showing one example of the operation of the incident ranking system illustrated in FIG. 5.

FIG. 6 is a flow diagram illustrating one example of the operation of incident ranking system 114 in more detail. It is assumed that incident link filter 250 first receives the incident clusters 154 (which includes links 156 and weights 158) as indicated by block 256 in the flow diagram of FIG. 6. Incident link filter 250 then filters low weight links as indicated by block 258. For instance, filter 250 can filter out links that have a weight that is below a threshold value, as indicated by block 260. Filtering can be performed in a wide variety of other ways as well, as indicated by block 262.

Ranking model 252 then sorts the incidents based upon the filtered links and their corresponding weights, as indicated by block 264. The incidents can be ranked based upon the number and weight of links to each incident, as indicated by block 266, or in a wide variety of other ways, as indicated by block 268. Ranking model 252 thus generates an output indicative of the ranked incidents as well as identifying the highest ranking incident, as indicated by block 270. The output (of ranked incidents identifying the highest ranked incident) is provided as ranked, related incidents 162 to result processor 128. Outputting the ranked incidents in this way is indicated by block 272 in the flow diagram of FIG. 6.

Figure 7:
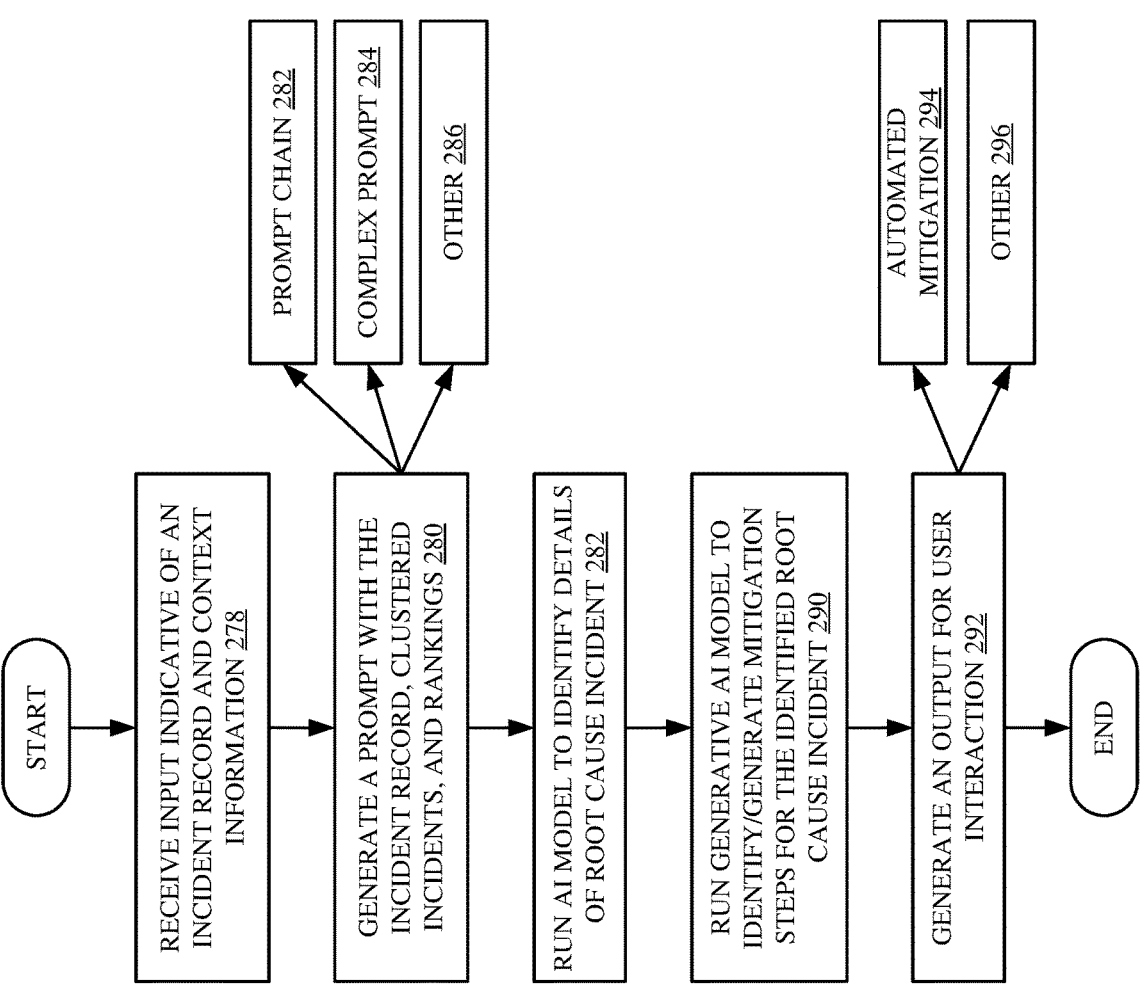
FIG. 7 is a flow diagram showing one example of the operation of a prompt generation system.

FIG. 7 is a flow diagram illustrating one example of the operation of AI system 105, in more detail. It is first assumed that prompt generation system 106 receives an output from result processor 128 that is indicative of the incident record 140 corresponding to a newly received incident, along with context information that identifies the ranked, related incidents 162 (including a top ranked incident). Receiving an input indicative of an incident record and context information is indicated by block 278 in the flow diagram of FIG. 7. Prompt generation system 106 then generates a prompt with the incident record and the clustered incidents and rankings, as indicated by block 280. The prompt can include a prompt chain 282 which is a sequentially executed series of prompts that is executed against root cause processing system 108, or a complex prompt 284 that prompts root cause processing system 108 to identify the root cause and mitigation steps in a single prompt. In one example, prompt generation system 106 can use prompt template filling or other prompt techniques to generate the prompt. For instance, when prompt generation system 106 uses a template or other technique to generate the prompt, the prompt may include an instruction portion that is pre-populated or automatically filled out, based on a user input or another input, to include an instruction to identify mitigation steps for the root cause incident that is identified by the top-ranked incident.

The prompt generation system 106 can then add context information to the prompt. The context information can include the other incidents in the cluster, the rank order for those incidents, the links and weights, and any other data corresponding to those incidents, such as when and where the incidents occurred, a timeline of when the different incidents occurred, etc.

The context information can also include examples of root cause incidents and mitigation steps used to mitigate those root cause incidents. For instance, the prompt generation system 106 can access an example data store of historic incidents and mitigation steps (e.g., data store 118 or another data store), indexed by incident. The prompt generation system 106 can identify an incident in the example data store that is similar (in terms of similarity criteria such as a semantic or linguistic description of the incident in the incident record, incident occurrence timing, where the incident occurred, or other similarity criteria), and include, in the prompt, the incident extracted from the example data store along with the corresponding mitigation steps as an example for the model 108.

The prompt generation system 106 can also augment the instruction portion of the prompt to include a request to identify code or script or commands that can be automatically executed to mitigate the root cause incident. Further, the instruction portion can request the model 108 to generate a step-by-step mitigation plan for mitigating the root cause incident. This and other information can be added to the prompt. The prompt can be constructed to instruct the model 108 to use chain-of-thought reasoning to guide the model 108 through the generation process and to make the process more explicit.

In response, the model 108 performs generation to output the mitigation plan, mitigation steps, etc., as instructed. Generating a prompt can be performed in other ways as well, as indicated by block 286.

Based upon the prompt 164, root cause identifier 144 (which may be an AI classifier or another AI model) runs to identify a root cause incident 168, as indicated by block 288 in the flow diagram of FIG. 7. In one example, root cause identifier 144 identifies the top ranked incident as the root cause incident 168. Root cause identifier 144 then identifies the details corresponding to the identified root cause incident, such as text and other details. Mitigation step identifier 146 (which may be a generative AI model or another model) runs to identify or generate mitigation steps for the identified root cause incident, based on the incident and details, as indicated by block 290 in the flow diagram of FIG. 7. Root cause processing system 108 returns a response 166 which can be output to an engineering system or another system for user interaction. Response 166 can include computer commands, scripts, or code, along with other mitigation step information. Generating such an output is indicated by block 292 in the flow diagram of FIG. 7. The response 166 may be configured so that the mitigation steps 170 can be automatically executed, as indicated by block 294, or the output can be generated and configured in other ways, as indicated by block 296.

Figure 8:
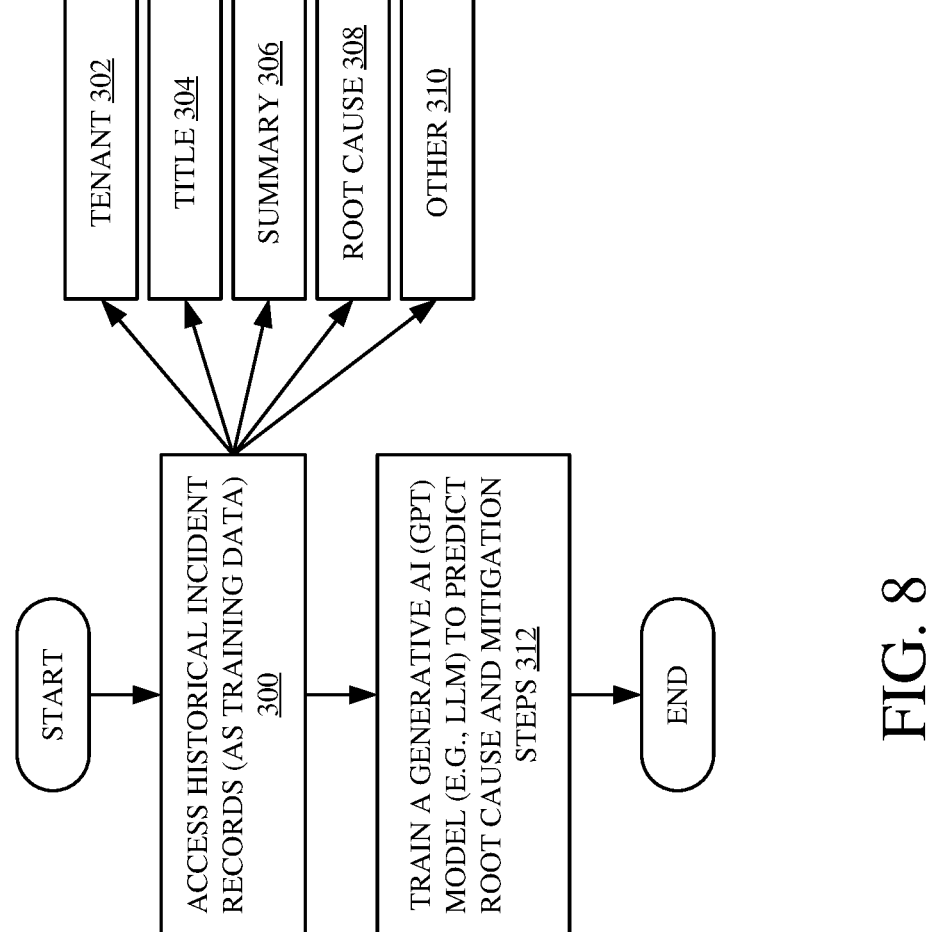
FIG. 8 is a flow diagram showing one example of the operation of a model training system.

FIG. 8 is a flow diagram illustrating one example of the operation of model training system 116 in more detail. Model training system 116 can be any desired type of model training algorithm or system that runs a model training algorithm to train root cause processing system 108. In one example, model training system 116 first obtains a generative pre-trained transformer (GPT) and fine tunes that transformer using historical incident/root cause data stored in record store 118. Thus, model training system 116 accesses the initial model and the historical incident records (as training data) as indicated by block 300 in the flow diagram of FIG. 8. The training data in store 118 can include a tenant identifier 302 identifying the tenant where the incident record originated, a title 304 of the incident record, a summary 306 of the incident, a root cause incident 308 that was the root cause of the incident reflected in the incident record, and any of a wide variety of other information 310. Model training system 116 then trains or fine tunes the initial generative AI (GPT) model (which may be a large language model or another model) to predict the root cause and mitigation steps, when prompted. Generating the AI model in this way is indicated by block 312 in the flow diagram of FIG. 8.

It can thus be seen that the present description describes a system that automatically and accurately identifies a root cause for an incident that has been detected. The present system identifies related incidents, ranks the related incidents, and identifies a root cause incident. Based on the root cause incident, a set of mitigation steps can be generated to remedy or mitigate the impact of the root cause incident. This leads to a mitigation system that operates much more quickly and more accurately, and which greatly improves the operation of the underlying computing system.

It will be noted that the above discussion has described a variety of different systems, components, models, and/or logic. It will be appreciated that such systems, components, models, and/or logic can be comprised of hardware items (such as processors and associated memory, or other processing components, some of which are described below) that perform the functions associated with those systems, components, models, and/or logic. In addition, the systems, components, models, and/or logic can be comprised of software that is loaded into a memory and is subsequently executed by a processor or server, or other computing component, as described below. The systems, components, models, and/or logic can also be comprised of different combinations of hardware, software, firmware, etc., some examples of which are described below. These are only some examples of different structures that can be used to form the systems, components, models, and/or logic described above. Other structures can be used as well.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, they can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 9:
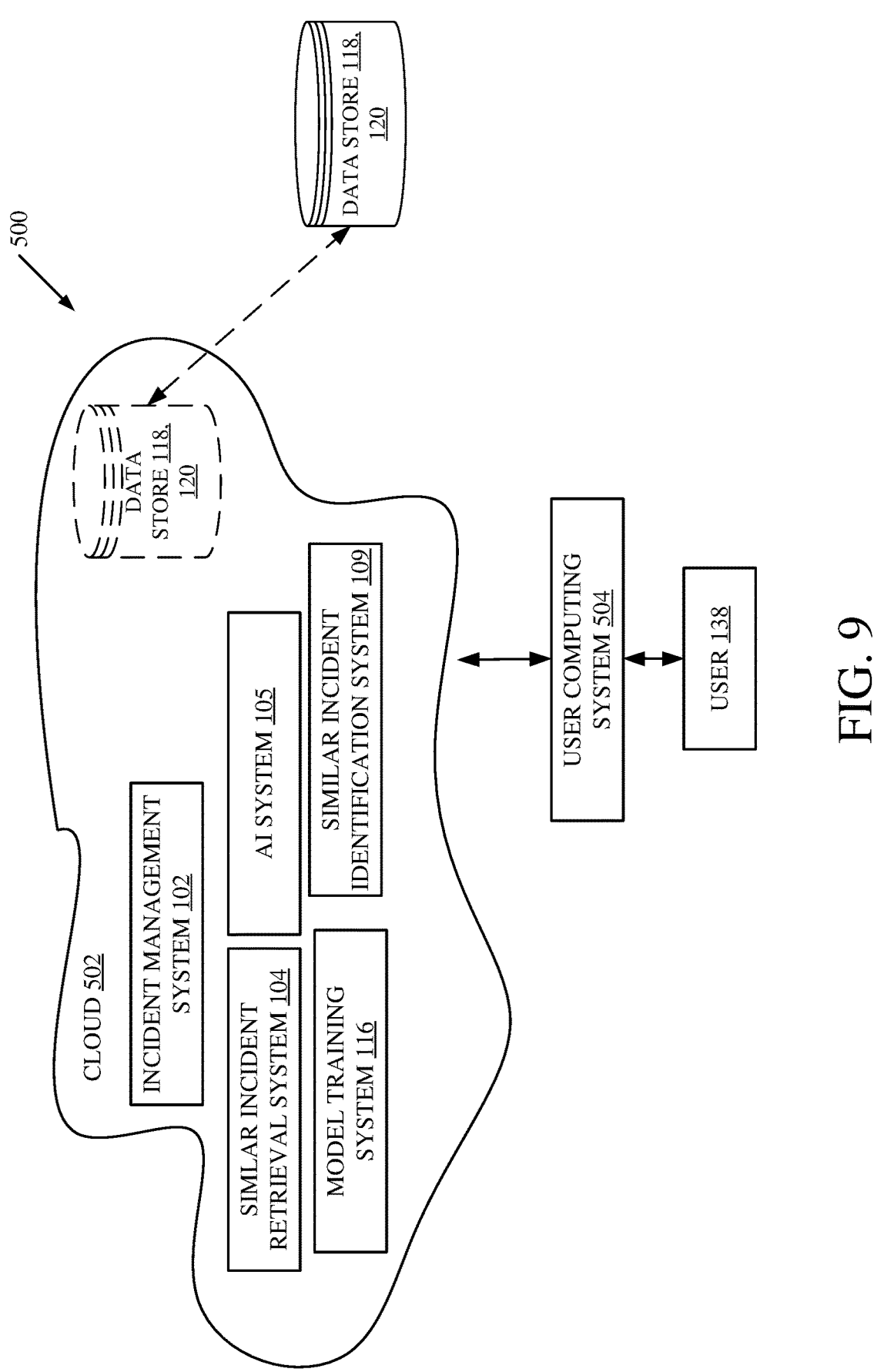
FIG. 9 is a block diagram showing one example of the computing system architecture deployed in a remote server architecture.

FIG. 9 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or the resources can be dispersed. Cloud computing infrastructures can deliver services through shared data centers, even though they appear as a single point of access for the user. Thus, the components and functions described herein can be provided from a service provider at a remote location using a cloud computing architecture. Alternatively, the components and functions can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 9, some items are similar to those shown in FIG. 1 and they are similarly numbered. FIG. 9 specifically shows that the system can be located in cloud 502 (which can be public, private, or a combination where portions are public while others are private). Therefore, user 138 uses a user device 504 to access those systems through cloud 502.

FIG. 9 also depicts another example of a cloud architecture. FIG. 9 shows that it is also contemplated that some elements of computing system architecture 100 can be disposed in cloud 502 while others are not. By way of example, data stores 118 and 120 can be disposed outside of cloud 502, and accessed through cloud 502. Regardless of where the items are located, the items can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
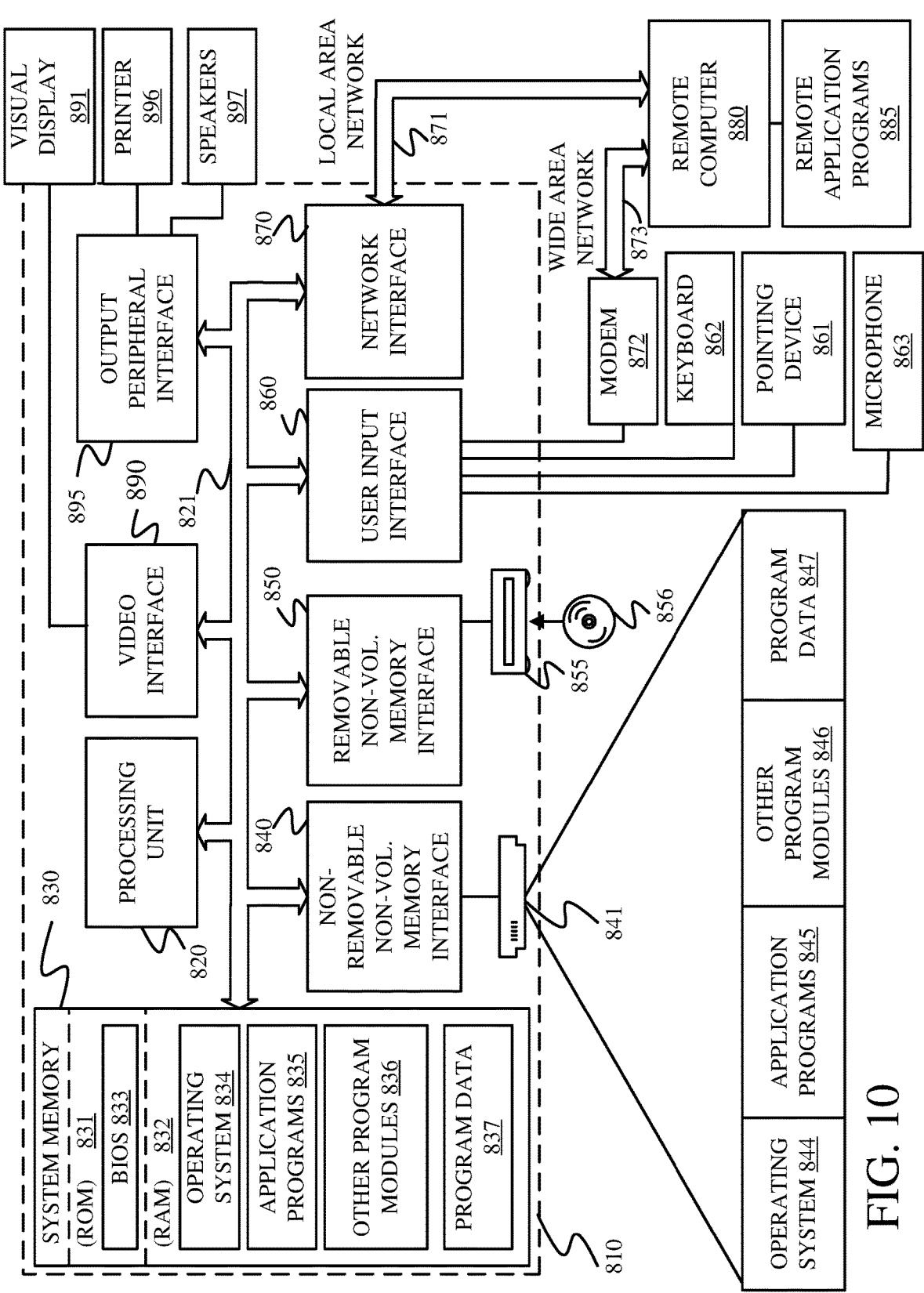
FIG. 10 is a block diagram showing one example of a computing environment that can be used in the systems and architectures shown in previous figures.

FIG. 10 is one example of a computing environment in which architecture 100, or parts of it, (for example) can be deployed. With reference to FIG. 10, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computing storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
    receiving a first incident record indicative of a detected incident;
    accessing a set of historic incident records indicative of historic incidents detected within a threshold time period, wherein the set of historic incident records include descriptive information that describes the historic incidents;
    for a set of incident records including the set of historic incident records and the first incident record, identifying a set of incident record pairs of incident records and, for each incident record pair:
        tokenizing information of the incident record pair; and
        generating, from the tokenized information, an embedding for each incident record of the incident record pair, the embedding representing the incident record in a multi-dimensional embedding space that encodes a semantic meaning of the respective incident record;
    for each incident record pair of the set of incident record pairs:
        determining a distance metric between the embeddings of the associated incident records; and
        if the distance metric is below a threshold distance, generating a link and a relatedness weight for the associated incident records;
    identifying a set of related incident records, from the set of incident records, that are related to the first incident record, including:
        clustering the first incident record and the set of related incident records based on each incident record of the set of related incident records being at least indirectly connected to the first incident record via the generated links, to obtain a cluster of incident records;
    ranking the incident records in the cluster of incident records into a set of ranked incident records based on, for each incident record in the cluster of incident records, a number of links and associated relatedness weights connected to the incident record;
    selecting one of the incident records of the cluster of incident records as a root cause incident record for the cluster of incident records based on rankings of the set of ranked incident records; and
    generating a mitigation step, based on the root cause incident record, to mitigate the associated incident of the root cause incident record by:
        generating a prompt to a generative artificial intelligence (AI) model, the prompt including an instruction to generate the mitigation step, the prompt further including context data, indicative of the ranked incident records; and
        receiving from the generative AI model, as a response to the prompt, the mitigation step.

2. The computer implemented method of claim 1 wherein identifying the set of related incident records comprises:
    generating a similarity metric indicative of a similarity of the incident records in the set of related incident records; and
    comparing the similarity metric to a threshold similarity metric to determine that the set of related incident records are similar to one another.

3. The computer implemented method of claim 2 wherein generating the similarity metric comprises:
    selecting a pair of incident records;
    generating an embedding for each of the pair of incident records; and
    calculating a distance between the embeddings, as the similarity metric.

4. The computer implemented method of claim 1 and further comprising:
    receiving a user-generated link between the first incident record and another incident record.

5. The computer implemented method of claim 4 wherein clustering comprises:
    clustering the first incident record and the set of related incident records based on the links and based on the user-generated links.

6. The computer implemented method of claim 5 and further comprising:
    for each link, assigning a weight to the link indicative of a relatedness of the incident records linked by the link.

7. The computer implemented method of claim 6 wherein ranking comprises:
    ranking the incident records in the cluster of incident records based on the links and assigned weights.

8. The computer implemented method of claim 7 wherein ranking comprises:
    applying the links and assigned weights to an artificial neural network (ANN) ranking model; and
    receiving, from the ANN ranking model, a ranking indicator indicative of a ranking of the incident records.

9. The computer implemented method of claim 1 wherein generating the mitigation step comprises:
    generating the prompt to the generative AI model, the prompt identifying the root cause incident record, and the instruction instructing the generative AI model to generate a step-by-step mitigation plan to mitigate the associated incident of the root cause incident record; and
    receiving, from the generative AI model, as a response to the prompt, a set of computer executable instructions that are executed to perform the step-by-step mitigation plan.

10. A computing system, comprising:
    an incident linking system configured to receive a first incident record and access a set of historic incident records to identify a set of related historic incident records that are related to the first incident record, and wherein the set of historic incident records include descriptive information that describe associated historic incidents of the historic incident records;
    an identification system configured to, for a set of incident records including the set of historic incident records and the first incident record, identify a set of incident record pairs of incident records;

a tokenizing system configured to, for each incident record pair, tokenize information of the incident record pair and generate, from the tokenized information, an embedding for each incident record of the incident record pair, the embedding representing the incident record in a multi-dimensional embedding space that encodes a semantic meaning of the respective incident record;

a distance metric determination system configured to, for each incident record pair of the set of incident record pairs, determine a distance metric between the embedding of the associated incident records and, if the distance metric is below a threshold distance, generate a link and a relatedness weight for the associated incident records;

an incident clustering system configured to cluster the first incident record and the set of related historic incident records based on the links to obtain a cluster of incident records;

an incident ranking system configured to rank the first incident record and the set of related historic incident records in the cluster of incident records into a ranked incident records; and a root cause processing system configured to identify one incident record of the cluster of incident records as a root cause incident record for the cluster of incident records based on the ranked incident records, and to generate a mitigation step, based on the root cause incident record, to mitigate an associated root cause incident of the root cause incident record, wherein generating the mitigation step comprises:

generating a prompt to a generative artificial intelligence (AI) model, the prompt including an instruction to generate the mitigation step, the prompt further including context data, indicative of the ranked incident records; and receiving from the generative AI model, as a response to the prompt, the mitigation step.

11. The computing system of claim 10 wherein the incident linking system is configured to identify the set of related historic incident records, generate a similarity metric indicative of a similarity of the incident records in the set of related historic incident records, and further comprising:

a related/unrelated classifier configured to compare the similarity metric to a threshold similarity metric to determine that the related historic incident records are similar to one another.

12. The computing system of claim 10 wherein the clustering system is configured to receive a user-generated link between the first incident record and another incident record and to cluster the first incident record and the set of related historic incident records based on the links and based on the user-generated links.

13. The computing system of claim 12 wherein the incident linking system comprises:

a weight generator configured to, for each link, assign a weight to the link indicative of a relatedness of the incident records linked by the link.

14. The computing system of claim 13 wherein the incident ranking system is configured to rank the incident records in the cluster of incident records based on the links and assigned weights.

15. The computing system of claim 14 wherein the incident ranking system comprises:

an artificial neural network (ANN) ranking model configured to receive the links and assigned weights and generate a ranking indicator indicative of a ranking of the incident records.

16. The computing system of claim 15 wherein the root cause processing system comprises an artificial intelligence (AI) model and further comprising:

a prompt generation system configured to generate a prompt to the AI model, the prompt including an instruction portion with an instruction to generate a mitigation plan for the associated root cause incident and a context data portion with context data including the ranked incident records, the AI model generating a response to the prompt, the response indicating the associated root cause incident and the mitigation plan.

17. A computer system, comprising:

a link generator configured to generate links, each link being between incident records in a set of related incident records, wherein the set of related incident records include descriptive information that describe an associated incident of each incident record, wherein the links are links in a multi-dimensional embedding space that indicates a semantic meaning of the respective incident records;

an incident rank processor configured to rank the incident records of the set of related incident records into a ranked incident records based on a distance metric of the links in the multi-dimensional embedding space; and a root cause identification processor configured to identify one incident record of the set of related incident records as a root cause incident record for the set of related incident records based on the ranked incident records, and to generate a mitigation step, based on the root cause incident record, wherein generating the mitigation step comprises:

generating a prompt to a generative artificial intelligence (AI) model, the prompt including an instruction to generate the mitigation step, the prompt further including context data, indicative of the ranked incident records; and receiving from the generative AI model, as a response to the prompt, the mitigation step.

18. The computer system of claim 17 wherein the root cause identification processor comprises:

a prompt generation system that generates a prompt with an instruction portion including an instruction to generate a mitigation plan to mitigate an associated root cause incident of the root cause incident record and a context data portion with context data including the ranked incident records; and a large language model configured to generate the mitigation plan based on the prompt.

\* \* \* \* \*